United States Patent
Tongue et al.

(10) Patent No.: US 12,319,363 B2
(45) Date of Patent: Jun. 3, 2025

(54) SYSTEM AND APPARATUS FOR REDUCING THE AERODYNAMIC DRAG OF A VEHICLE OR TRAILER

(71) Applicants: Stephen Edward Tongue, Hampden, MA (US); Joseph Robert Hamm, Monson, MA (US)

(72) Inventors: Stephen Edward Tongue, Hampden, MA (US); Joseph Robert Hamm, Monson, MA (US)

(73) Assignee: Streamliners, Inc., Monson, MA (US)

( * ) Notice: Subject to any disclaimer, the term of this patent is extended or adjusted under 35 U.S.C. 154(b) by 276 days.

(21) Appl. No.: 17/745,050

(22) Filed: May 16, 2022

(65) Prior Publication Data
US 2023/0001990 A1    Jan. 5, 2023

Related U.S. Application Data

(60) Provisional application No. 63/181,468, filed on Apr. 29, 2021.

(51) Int. Cl.
*B62D 35/00* (2006.01)
*B60R 19/56* (2006.01)

(52) U.S. Cl.
CPC ............ *B62D 35/001* (2013.01); *B60R 19/56* (2013.01)

(58) Field of Classification Search
CPC ........ B60R 19/02; B60R 19/18; B60R 19/54; B60R 19/56; B60R 2019/005; B62D 35/001; B62D 35/007
USPC .......................................... 296/180.1, 187.11
See application file for complete search history.

(56) References Cited

U.S. PATENT DOCUMENTS

| | | | | |
|---|---|---|---|---|
| 10,525,920 B2* | 1/2020 | Fetz | ........... | B62D 25/2054 |
| 11,752,961 B2* | 9/2023 | Gauntt | ........... | B60R 19/56 |
| | | | | 293/142 |
| 2013/0169000 A1* | 7/2013 | Reiman | ........... | B62D 35/001 |
| | | | | 296/180.4 |
| 2019/0366964 A1* | 12/2019 | Miller | ........... | B60R 19/24 |
| 2021/0380056 A1* | 12/2021 | Gunaydin | ........... | B60R 19/18 |

FOREIGN PATENT DOCUMENTS

| | | | | |
|---|---|---|---|---|
| CN | 104786970 A | * | 7/2015 | ............. B60R 19/56 |
| WO | WO-2015080086 A1 | * | 6/2015 | ............. B60R 19/56 |

OTHER PUBLICATIONS

English translation of WO 2015/080086; retrieved via Patent Translate located at www.epo.org. (Year: 2024).*

* cited by examiner

*Primary Examiner* — Jason S Daniels
(74) *Attorney, Agent, or Firm* — Grogan, Tuccillo & Vanderleeden, LLP

(57) ABSTRACT

A rear impact guard includes at least one vertical member, and a horizontal member connected to a distal end of the at least one vertical member, the horizontal member having a plurality of through passages allowing for air flow through the horizontal member.

19 Claims, 18 Drawing Sheets

SYSTEM AND APPARATUS FOR REDUCING THE AERODYNAMIC DRAG OF A VEHICLE OR TRAILER

CROSS-REFERENCE TO RELATED APPLICATIONS

This application claims the benefit of U.S. Provisional Application Ser. No. 63/181,468, filed on Apr. 29, 2021, which is hereby incorporated by reference herein in its entirety.

FIELD OF THE INVENTION

The present invention relates generally to an apparatus for reducing the aerodynamic drag of a vehicle or trailer and, more particularly, to an underride guard for a truck or semi-trailer.

BACKGROUND OF THE INVENTION

There are millions of cars and trucks on the roads today, used for both personal passenger transport and the movement of goods, most of which rely on fossil fuel for propulsion. In the case of standard tractor trailers, at highway speeds, aerodynamic drag is responsible for approximately half of the vehicle's fuel burn, meaning that even slight reductions in aerodynamic drag can result in a significant improvement in fuel economy and annual savings in fuel.

There are several physical areas on tractor trailers that account for the most significant portion of fuel usage. In the case of class 8 semi-trailers, the more perpendicular and vertical front areas of the tractor such as the radiator grill and windshield are significant, along with the gap between the tractor and trailer, as well as the rear doors. This invention discloses a means to reduce the aerodynamic drag of the rear impact guard, sometimes referred to as the ICC bumper or underride guard, which can account for up to 2% of the vehicle drag, and over 1% of a tractor trailer's fuel consumption.

In view of the above, there is a need for an improved underride guard which reduces the aerodynamic resistance of vehicle such as tractor trailer trucks, without negatively affecting the safety or structural performance of the underride guard.

SUMMARY OF THE INVENTION

In view of the foregoing, it is an object of the present invention to provide an underride guard for a vehicle having a more aerodynamic design than existing underride guards.

It is another object of the present invention to provide an underride guard that has an improved aerodynamic performance without negatively affecting safety.

These and other objects are achieved by the present invention.

According to an embodiment of the present invention, a rear impact guard is provided. The rear impact guard includes at least one vertical member, and a horizontal member connected to a distal end of the at least one vertical member, the horizontal member having a plurality of flow through passages allowing for air flow through the horizontal member.

According to another embodiment of the present invention, a semi-trailer is provided. The semi-trailer includes a rear impact guard mounted at a rear end of the semi-trailer, the rear impact guard having a pair of vertical members, and a horizontal member carried at respective distal ends of the pair of vertical members. The horizontal member has a plurality of through passages allowing for air flow through the horizontal member to reduce aerodynamic drag of the semi-trailer.

According to yet another embodiment of the present invention, a method for reducing the aerodynamic drag of a vehicle or trailer is provided. The method includes the steps of mounting an underride guard to a rear of the vehicle or trailer, the underride guard having at least one vertical member and a horizontal member connected to a distal end of the at least one vertical member, the horizontal member having a plurality of through passages allowing for air flow through the horizontal member.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
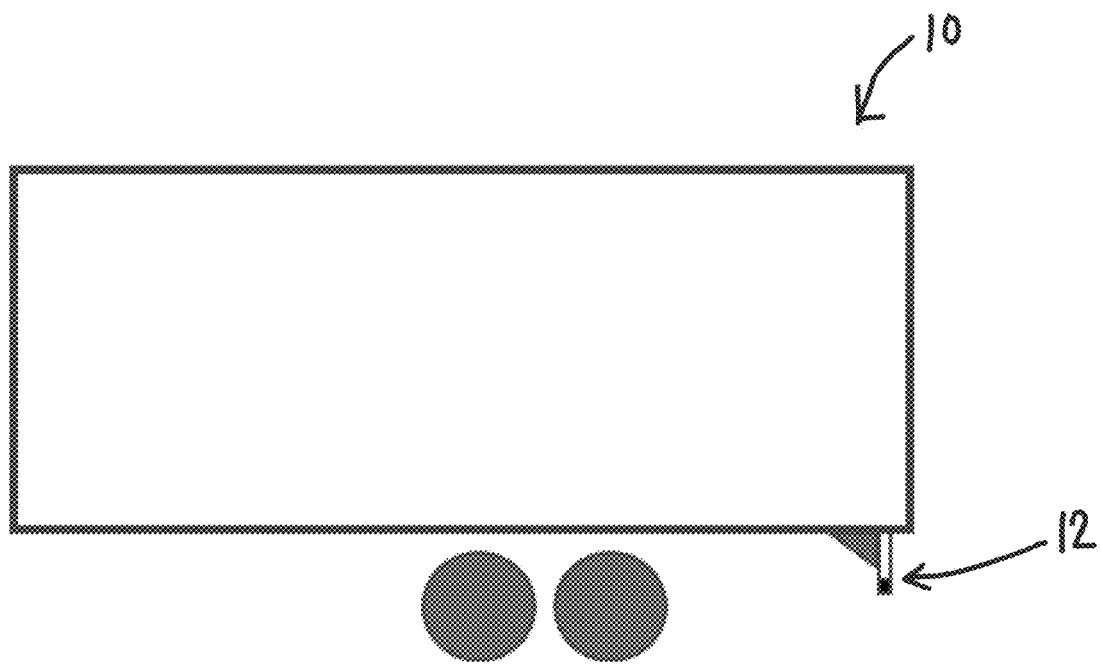
FIG. 1 is a simplified side elevational view of a rear portion of a semi-trailer showing a rear impact guard.
Figure 2:
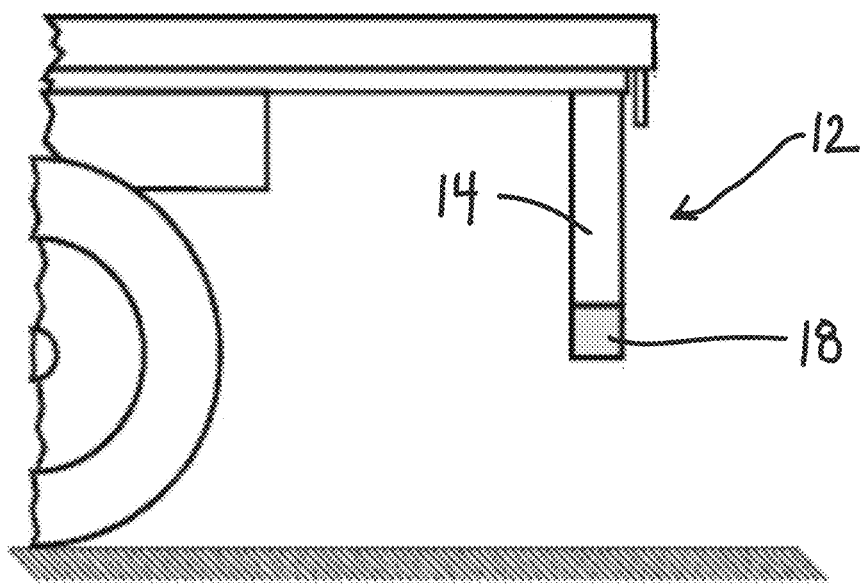
FIG. 2 is an enlarged, detail view of the rear impact guard of the semi-trailer of FIG. 1.
Figure 3:
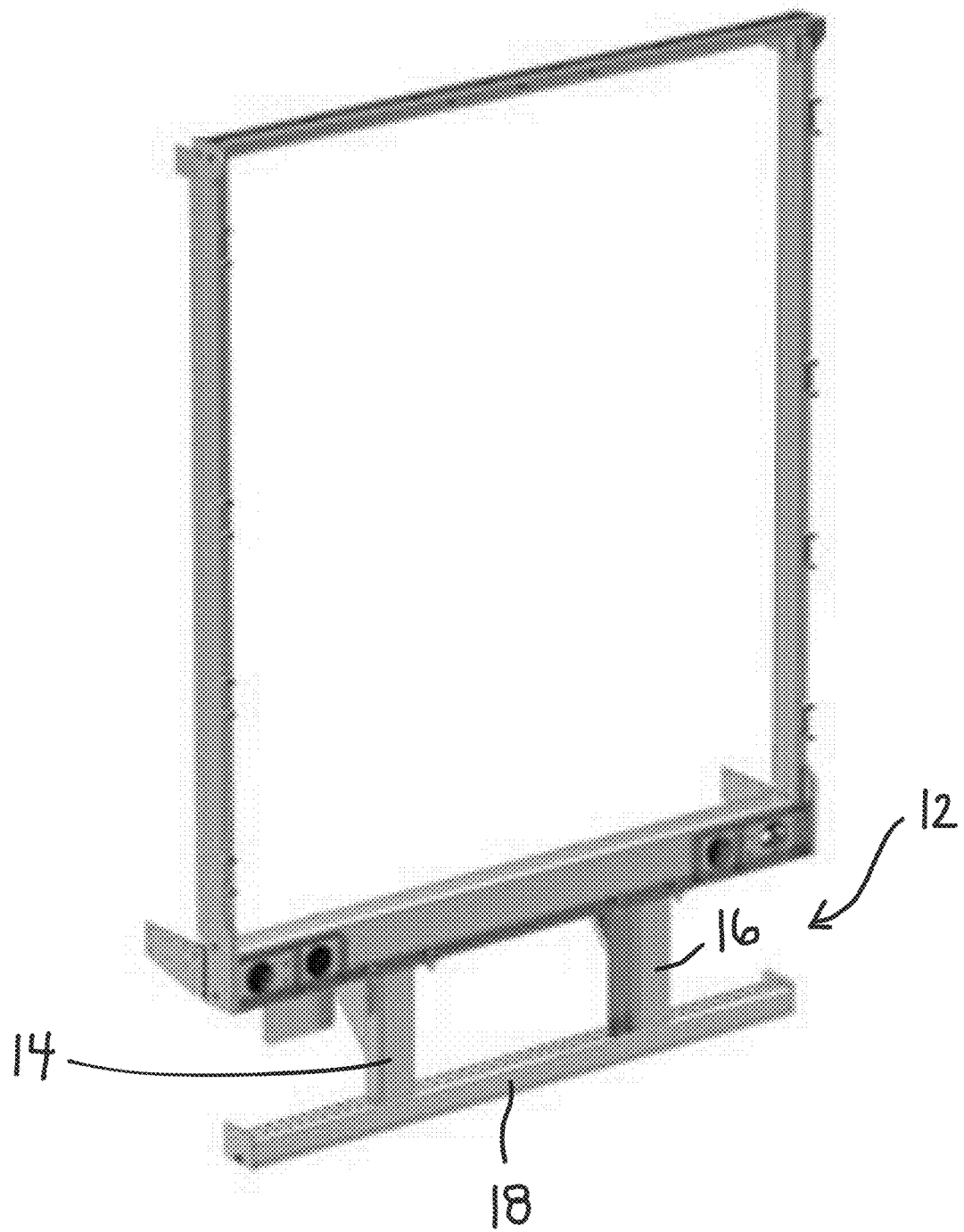
FIG. 3 is a is a simplified, perspective view of the rear of a typical semi-trailer, including the rear impact guard.

FIGS. 1-3 illustrate the rear portion of a semi-trailer 10. As shown therein, the semi-trailer 10 includes a rear impact guard 12, which is required on all trailers and many trucks by federal law to improve safety. The rear impact guard on any semi-trailer or truck has size, mounting position, and strength/safety requirements mandated by federal law, and normally consists of two vertical structural members 14, 16 that attach to the underside of the trailer, and a horizontal member 18 connected to the distal ends of the vertical members 14, 16 that prevents smaller vehicles from going under the trailer in the event of a collision. The rear impact guard is also commonly referred to as an (Interstate Commerce Commission (ICC) bumper or underride guard.

Figure 4:
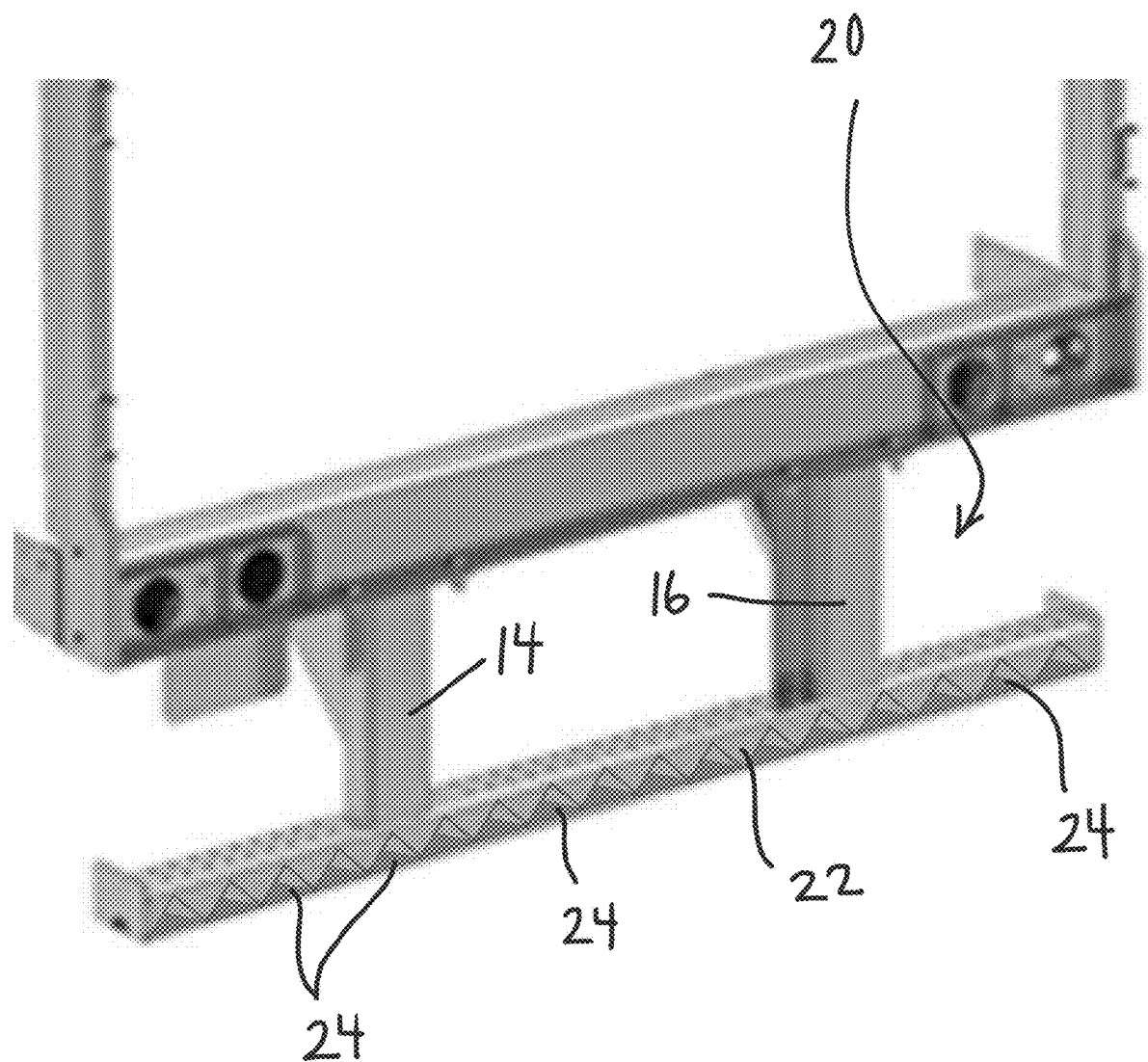
FIG. 4 is a perspective view of a rear impact guard for a semi-trailer according to an embodiment of the present invention.
Figure 5:
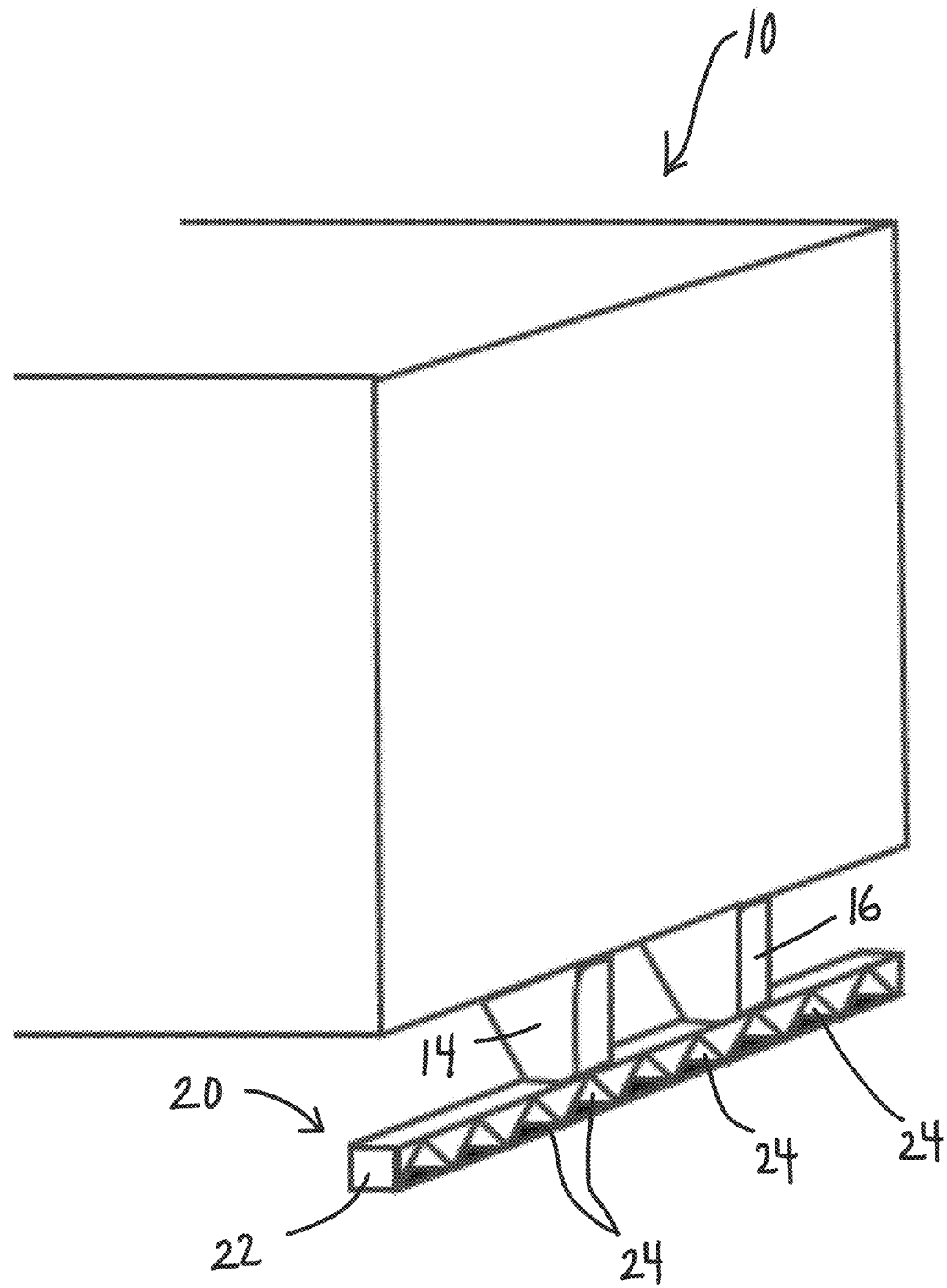
FIG. 5 is another perspective view of the rear impact guard of FIG. 4.
Figure 6:
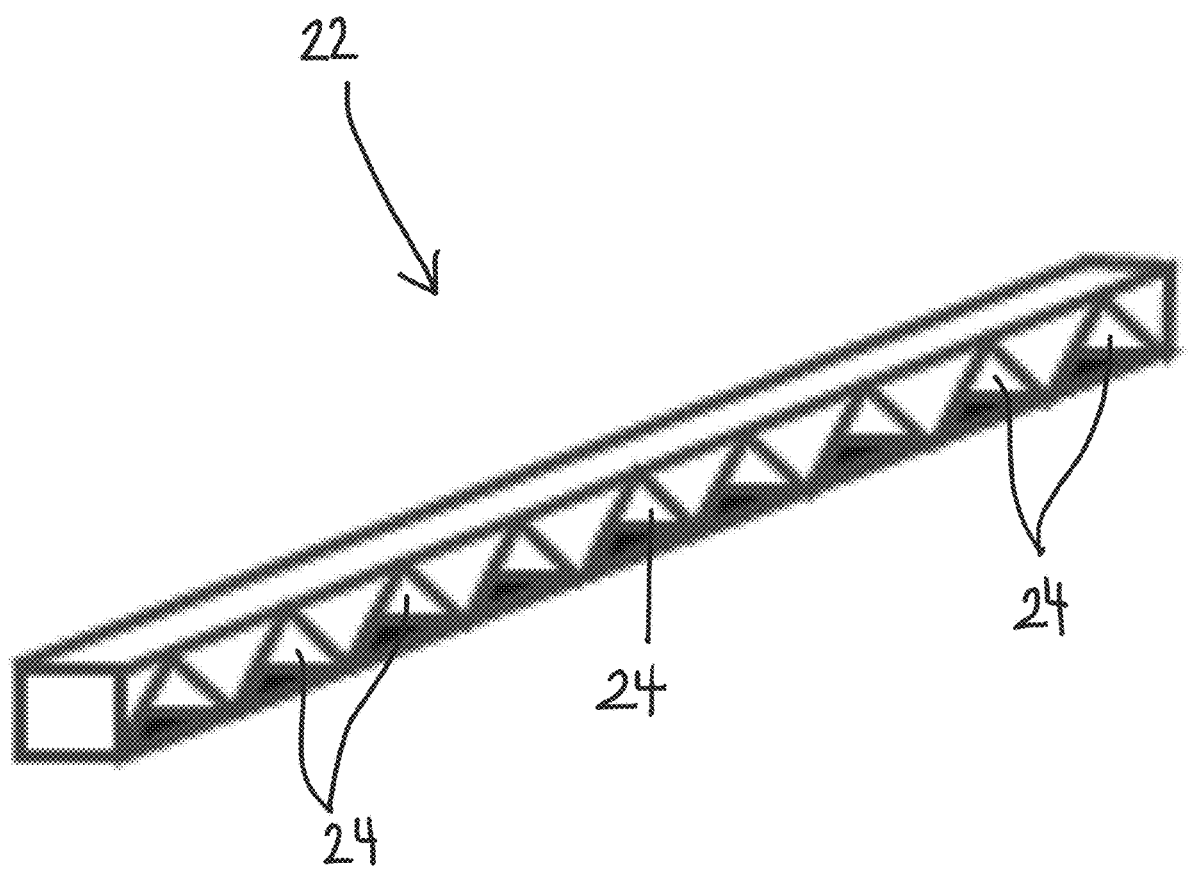
FIG. 6 is an enlarged, detail view of the horizontal member of the rear impact guard of FIG. 4.

Referring now to FIG. 4, a rear impact guard 20 according to an embodiment of the present invention is illustrated. As shown therein, the rear impact guard 20 has two vertical structural members 14, 16, as is known in the art, and a horizontal member 22. As illustrated, the horizontal member 22 is generally rectangular or square in cross-section, and has a plurality of through openings or passages 24 aligned in the driving direction of the trailer. In an embodiment, the horizontal member 22 is solid in construction, other than the through openings 24. The through passages are of a shape, configuration, size and location so as to maintain the structural integrity and intended function of the rear impact guard 20. For example, in an embodiment, the through passages 24 may be triangular in shape and may extend generally from a point adjacent to the top of the horizontal member 22 to a point adjacent to the bottom of the horizontal member 22.

Figure 7:
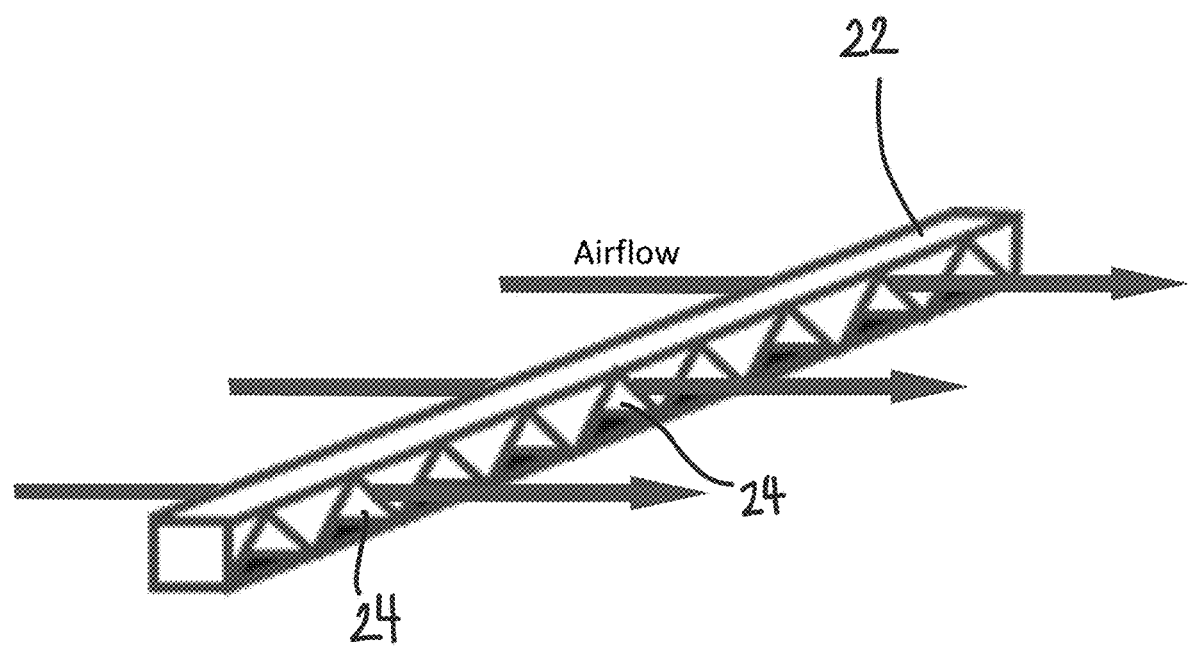
FIG. 7 is another enlarged, detail view of the rear impact guard of FIG. 4, illustrating the flow of air therethrough.

As best shown in FIG. 7, the through passages 24 in the horizontal member 22 of the rear impact guard 20 allow air to flow through the horizontal member 22 in the driving direction, thereby reducing the aerodynamic drag of the impact guard 20, and therefore reducing fuel consumption. As indicated above, the flow through passages 24 are configured to allow air to flow through while maintaining structural stiffness to meet safety requirements.

Figure 8:
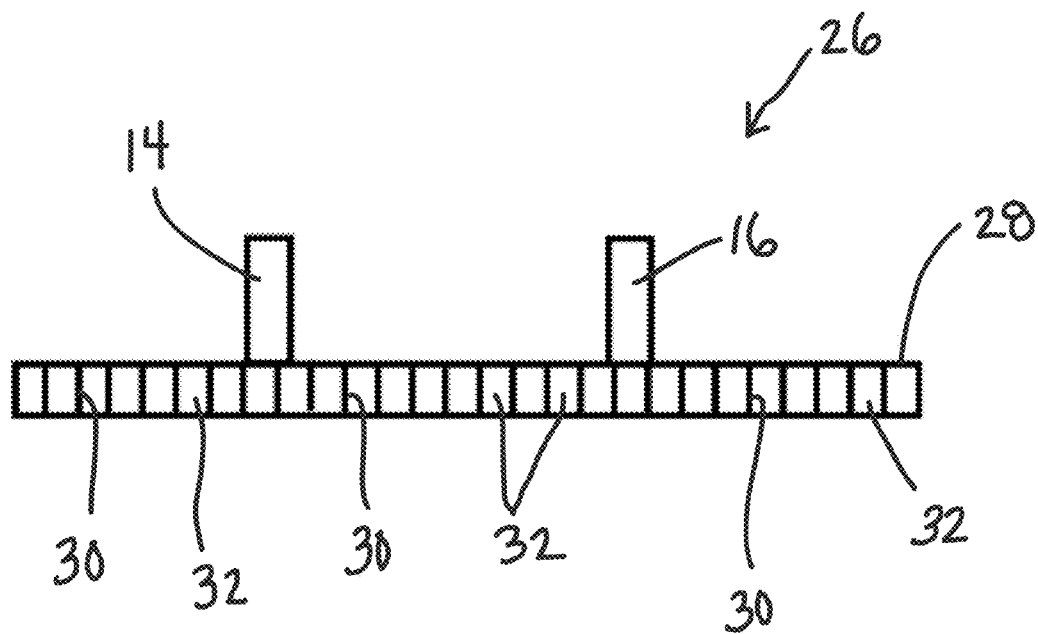
FIG. 8 is an elevational view of a rear impact guard for a semi-trailer, according to another embodiment of the invention.

FIGS. 8-11 illustrate additional configurations for a horizontal member of a rear impact guard, featuring various flow-through designs. All of these are possible variations of the essence of the present invention, allowing air to flow through the structural members of the rear impact guard to reduce drag and fuel consumption while maintaining structural stiffness in the required directions to meet safety requirements to withstand the force of rear impact collisions. For example. FIG. 8 illustrates a rear impact guard 26 having a horizontal member 28 having a plurality of vertical corrugations or structural ribs 30 defining therebetween a plurality of through passages 32 for the flow of air.

Figure 9:
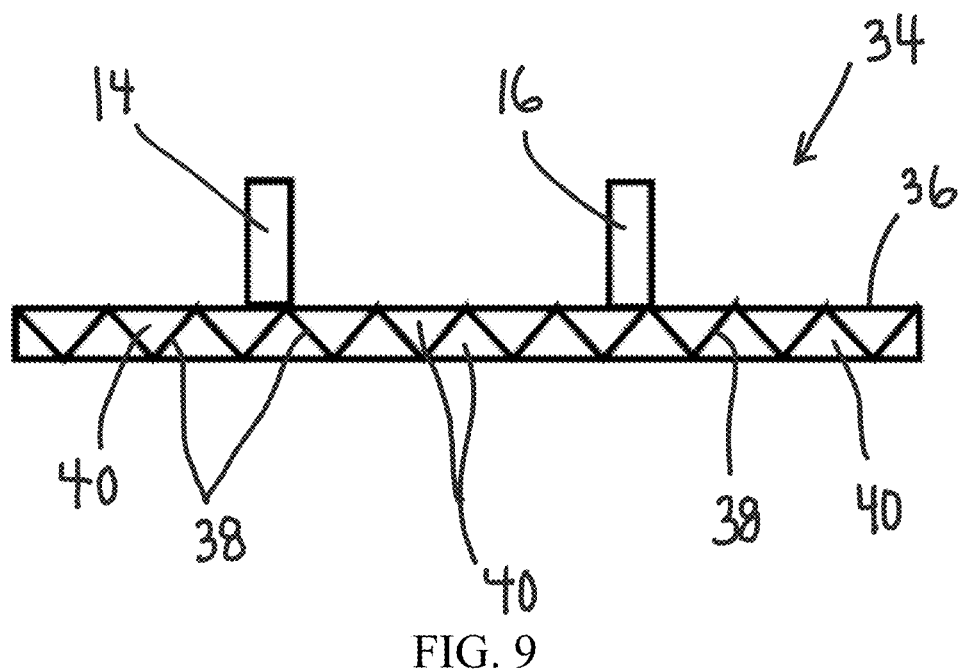
FIG. 9 is an elevational view of a rear impact guard for a semi-trailer, according to another embodiment of the invention.

FIG. 9 illustrates a rear impact guard 34 having a horizontal member 36 having a plurality of angled corrugations or structural ribs 38 (forming truss members) defining a plurality of triangular through passages 40 for the flow of air.

Figure 10:
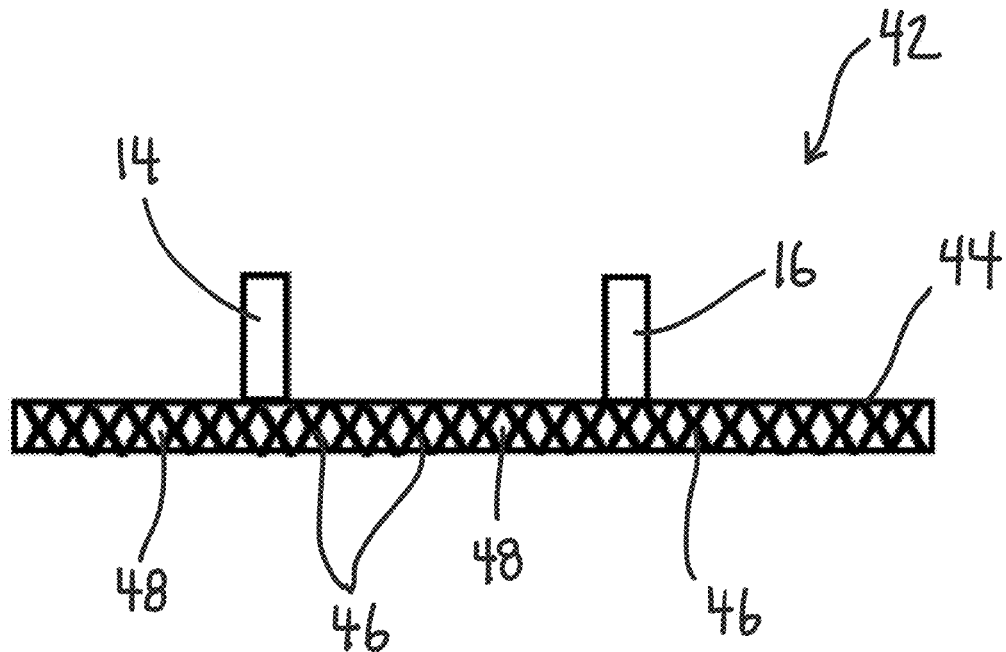
FIG. 10 is an elevational view of a rear impact guard for a semi-trailer, according to another embodiment of the invention.

FIG. 10 illustrates a rear impact guard 42 having a horizontal member 44 having a plurality of X-shaped structural members 46 (forming truss members) defining a plurality of diamond and triangular through passages 48 for the flow of air.

Figure 11:
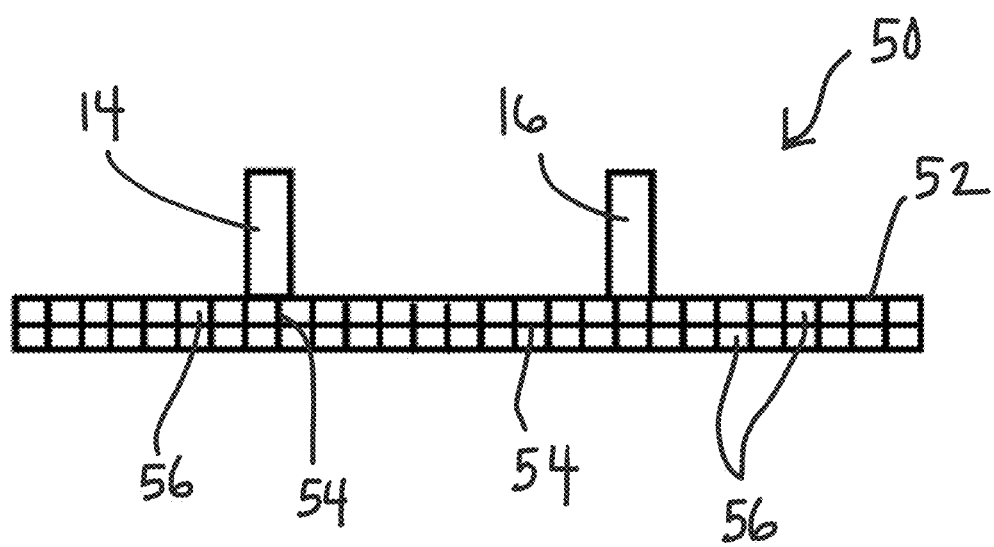
FIG. 11 is an elevational view of a rear impact guard for a semi-trailer, according to another embodiment of the invention.

FIG. 11 illustrates a rear impact guard 50 having a horizontal member 52 having a structural array formed by structural members 54 arranged in a waffle or grid pattern, and defining a plurality of square or rectangular through passages 56 for the flow of air.

Figure 12:
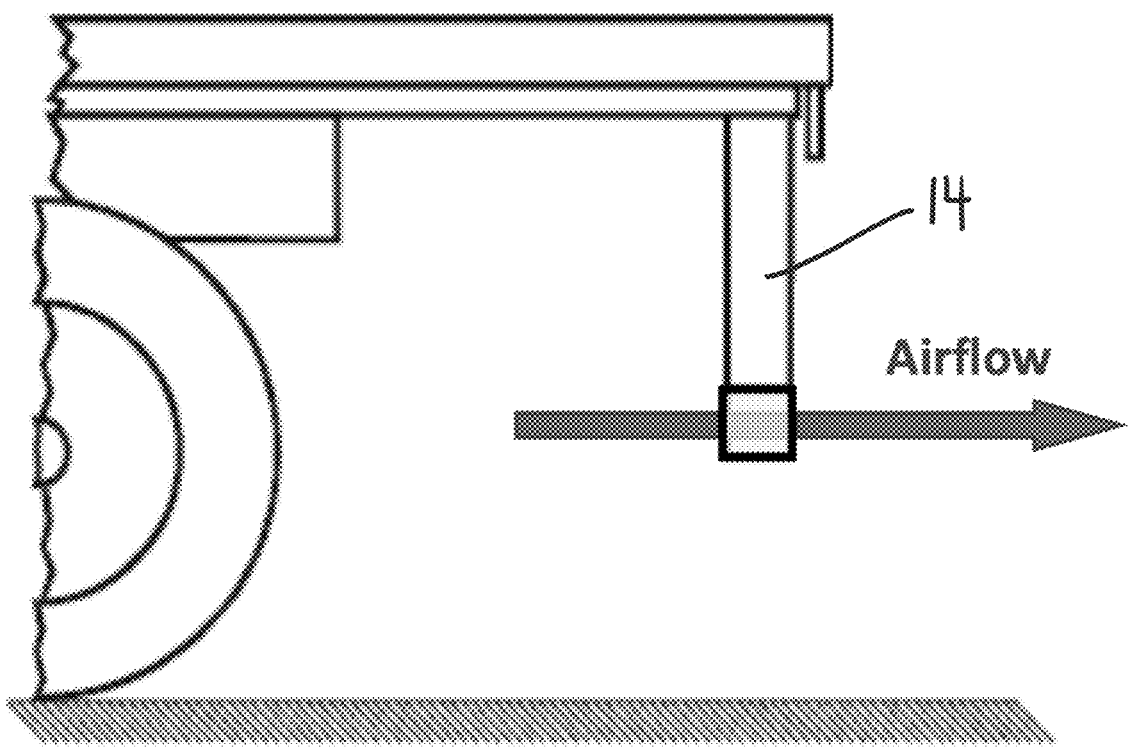
FIG. 12 is another side elevational view showing airflow through the rear impact guard of FIGS. 8-11.

FIG. 12 is a schematic illustration showing how air would flow through any of the horizontal members of the rear impact guards of FIGS. 8-11 during forward movement of the semi-trailer.

Figure 13:
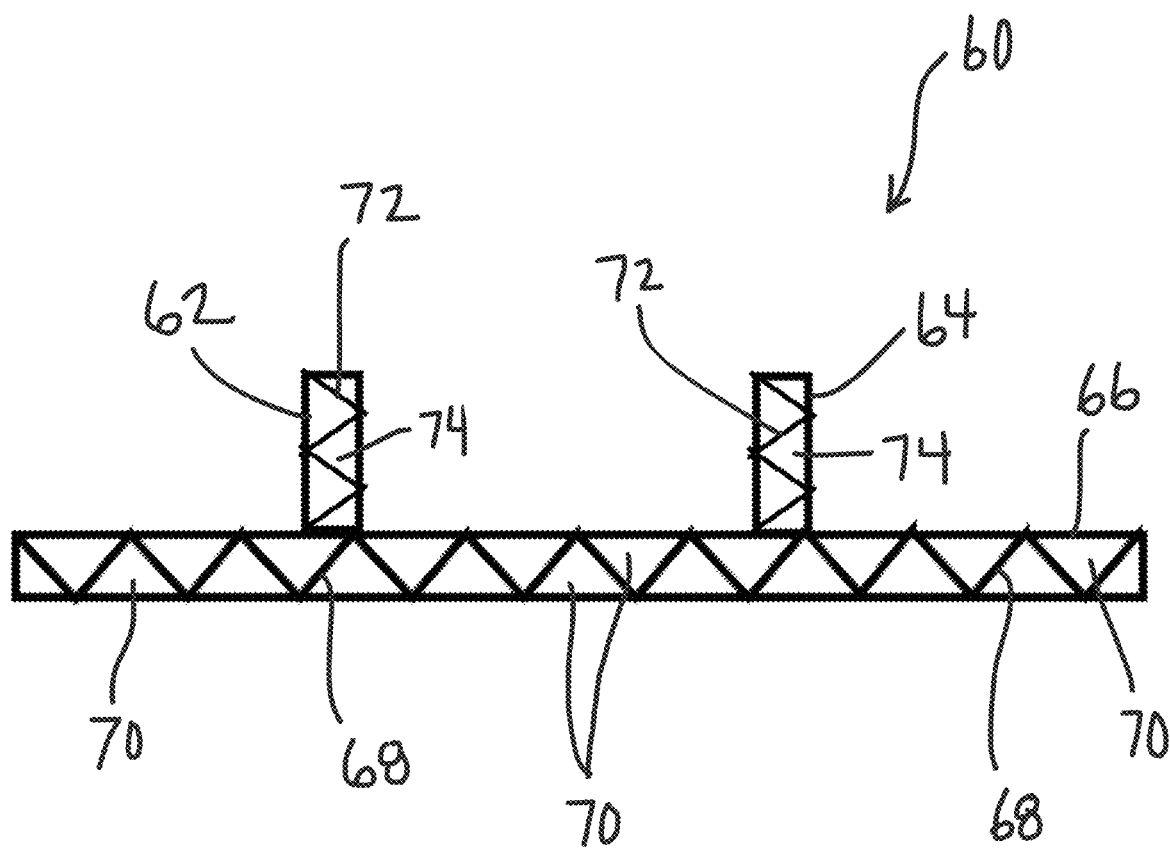
FIG. 13 is an elevational view of a rear impact guard for a semi-trailer according to another embodiment of the invention.

Referring now to FIG. 13, a rear impact guard 60 according to another embodiment of the present invention is illustrated. As shown therein, and similar to the impact guards disclosed above, rear impact guard 60 includes a pair of vertical structural members 62, 64 and a horizontal structural member 66. Similar to the rear impact guard 34 of FIG. 9, the horizontal member 66 of the rear impact guard 60 includes a plurality of angled corrugations or structural ribs 68 (forming truss members) defining a plurality of triangular through passages 70 for the flow of air. As shown therein, however, the vertical members 62, 64 also include a plurality of angled corrugations or structural ribs 72 (forming truss members) defining a plurality of triangular through passages 74 for the flow of air through the vertical members 62, 64. While FIG. 13 illustrates the use of corrugations forming triangular passages in the vertical members 62, 64 and horizontal member 66, it is not intended that the present invention be so limited in this regard. In particular, it is contemplated that the corrugations and flow passages in both the horizontal member and vertical members can have any shape or configuration, such as those shown in FIGS. 8-11. In addition, it is contemplated that differing configurations are also possible (e.g., triangular flow passages in the horizontal member, and rectangular flow passages in the vertical members).

Figure 14:
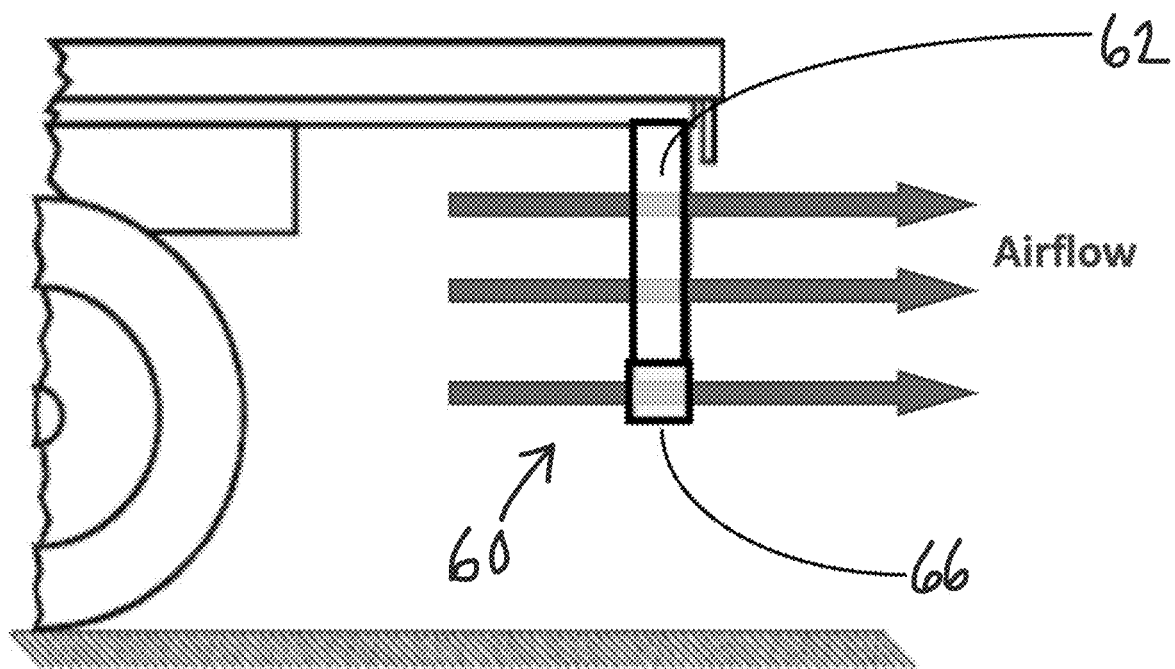
FIG. 14 is a side elevational view showing airflow through the rear impact guard of FIG. 13.

FIG. 14 illustrates airflow through both the vertical members 62, 64 and horizontal member 66 of rear impact guard 60.

FIGS. 15-18 illustrate additional configurations for a horizontal member of a rear impact guard, featuring various additional flow-through designs. These configurations illustrate an approach where some of the cross section (adjacent to the top of the horizontal member) allows air to flow, with solid, or non-flow through, sections (adjacent to the bottom of the horizontal member) where reflectors or reflective tape could be located on the rear-facing surface. This hybrid approach could provide flexible design options for reducing drag, while meeting both structural and conspicuity requirements. There are many possible configurations and embodiments of this hybrid approach which are all variations of a guard that contains some flow through areas and also some solid or non-flow through sections.

Figure 15:
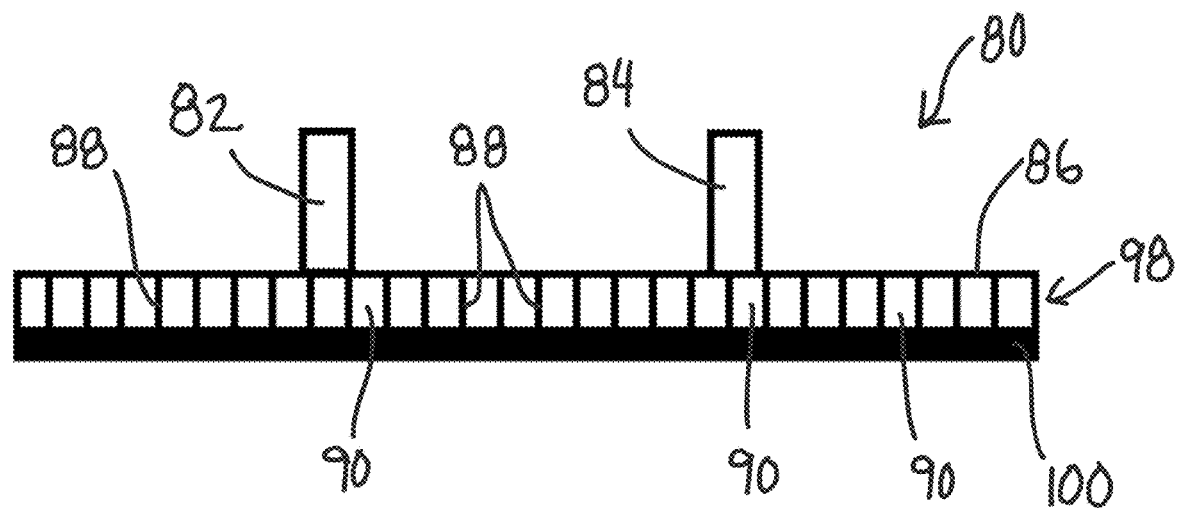
FIG. 15 is an elevational view of a rear impact guard for a semi-trailer, according to another embodiment of the invention.

For example, FIG. 15 illustrates a rear impact guard 80 having a pair of vertical members 82, 84 and a horizontal member 86 having an upper portion 98 having a plurality of vertical corrugations or structural ribs 88 defining therebetween a plurality of rectangular through passages 90 for the flow of air, and a solid lower portion 100 (i.e., devoid of through passages).

Figure 16:
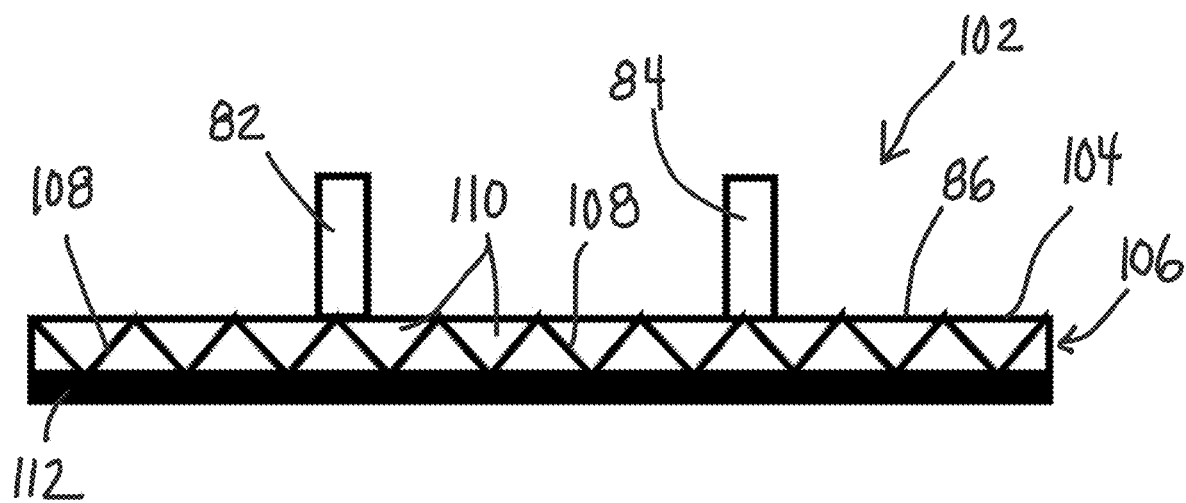
FIG. 16 is an elevational view of a rear impact guard for a semi-trailer, according to another embodiment of the invention.

FIG. 16 illustrates a rear impact guard 102 having a pair of vertical members 82, 84 and a horizontal member 104 having an upper portion 106 having a plurality of angled corrugations or structural ribs 108 (forming truss members) defining a plurality of triangular through passages 110 for the flow of air, and a solid lower portion 112 (i.e., devoid of through passages).

Figure 17:
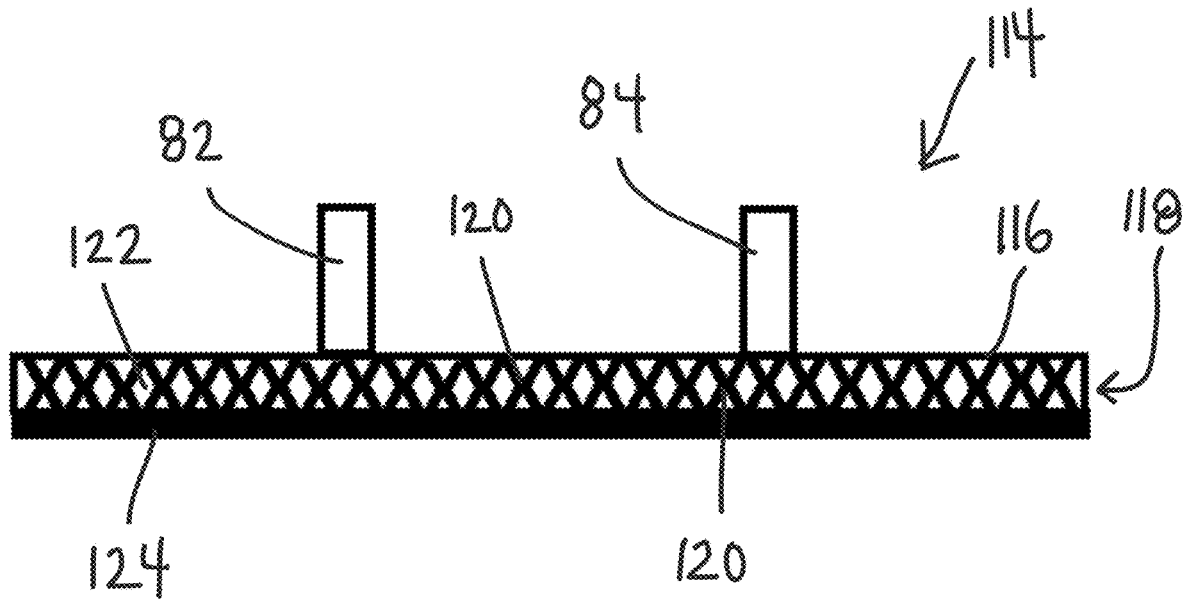
FIG. 17 is an elevational view of a rear impact guard for a semi-trailer, according to another embodiment of the invention.

FIG. 17 illustrates a rear impact guard 114 having a pair of vertical members 82, 84 and a horizontal member 116 having an upper portion 118 having a plurality of X-shaped structural members 120 (forming truss members) defining a plurality of diamond and triangular through passages 122 for the flow of air, and a solid lower portion 124 (i.e., devoid of through passages).

Figure 18:
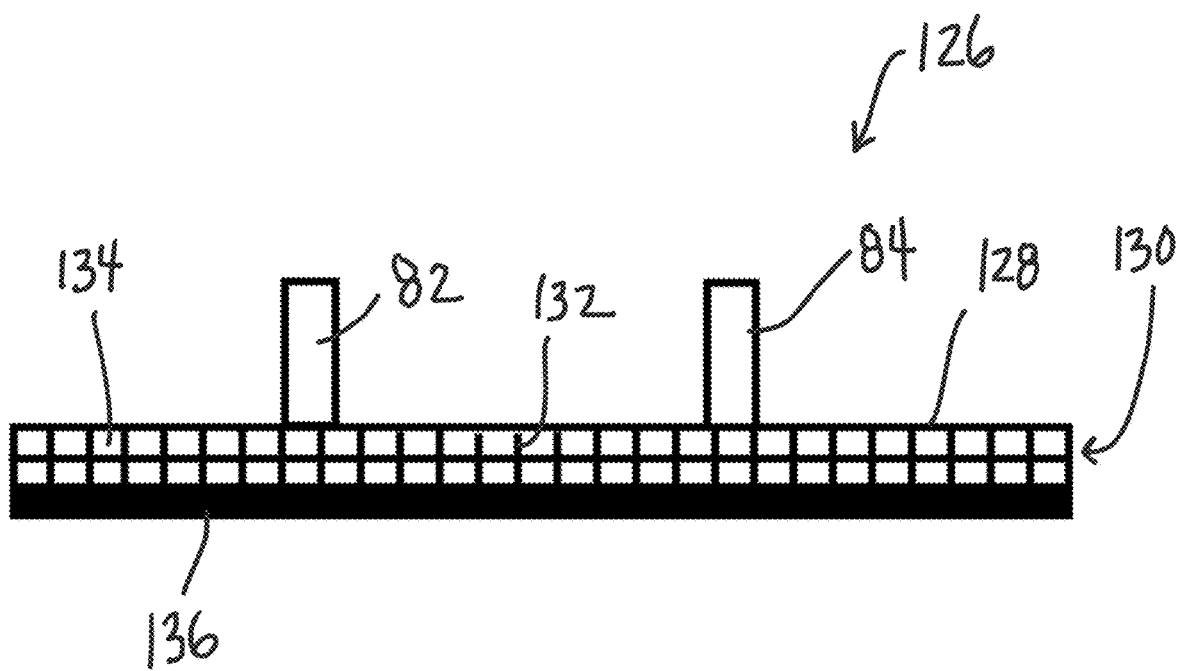
FIG. 18 is an elevational view of a rear impact guard for a semi-trailer, according to another embodiment of the invention.

FIG. 18 illustrates a rear impact guard 126 having a pair of vertical members 82, 84 and a horizontal member 128 having an upper portion 130 having a structural array formed by structural members 132 arranged in a waffle or grid pattern, and defining a plurality of square or rectangular through passages 134 for the flow of air, and a solid lower portion 136 (i.e., devoid of through passages).

Figure 19:
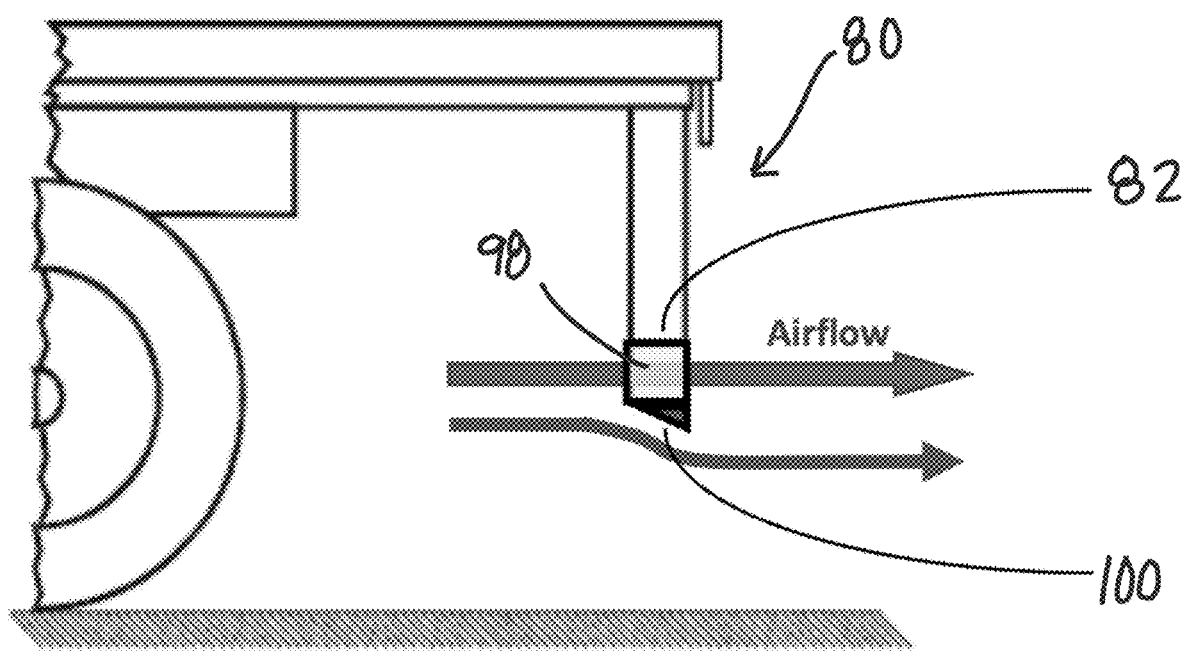
FIG. 19 is a side elevational view showing airflow through a rear impact guards of the invention.
Figure 20:
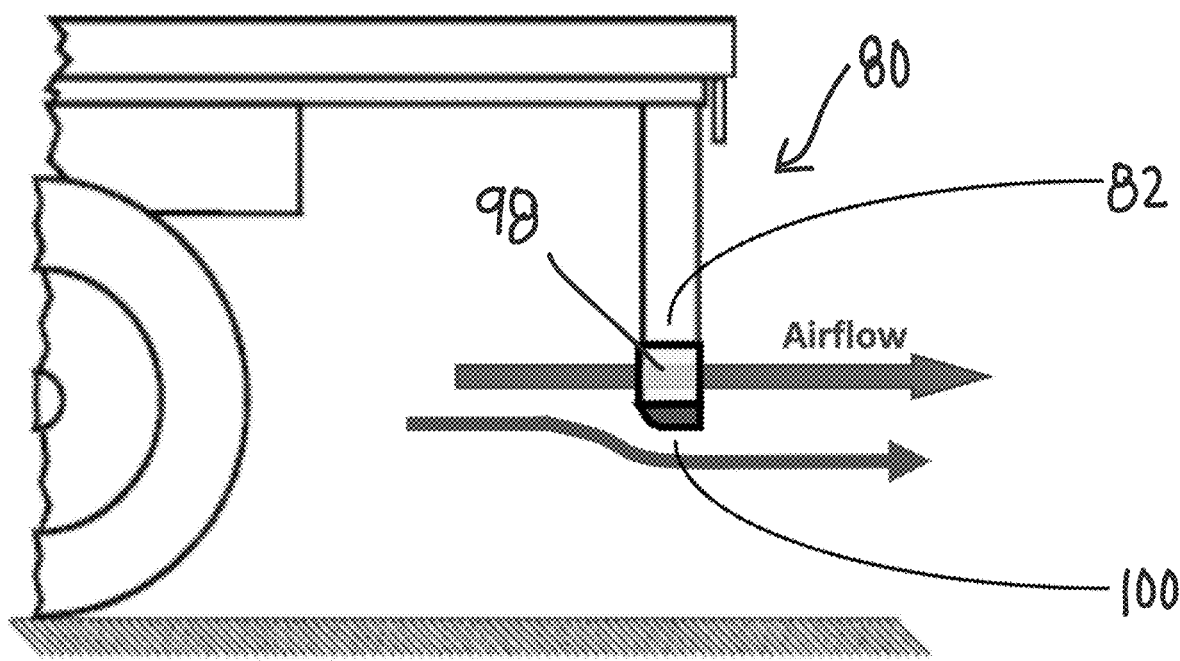
FIG. 20 is a side elevational view showing airflow through a rear impact guard of the invention.

FIG. 19 is a side elevational view showing airflow past the rear impact guards of FIGS. 15-18. As illustrated therein, air is permitted to flow through the rear impact guard, e.g., impact guard 80 via the passages 90 in the upper portion 98. Some airflow, however, is deflected below and past the rear impact guard 80 by the solid lower portion 100. The impact guards of FIGS. 16-18 have s similar airflow profile. As further shown in FIG. 19, in an embodiment the solid lower portion of the horizontal member may be angled so as to better deflect airflow beneath the horizontal member. The angled lower portion 100 thus further reduces aerodynamic drag, even in non-flow through areas. FIG. 20 shows a similar configuration, with lower section of the impact guard. 80 having a slightly different shape/configuration.

Figure 21:
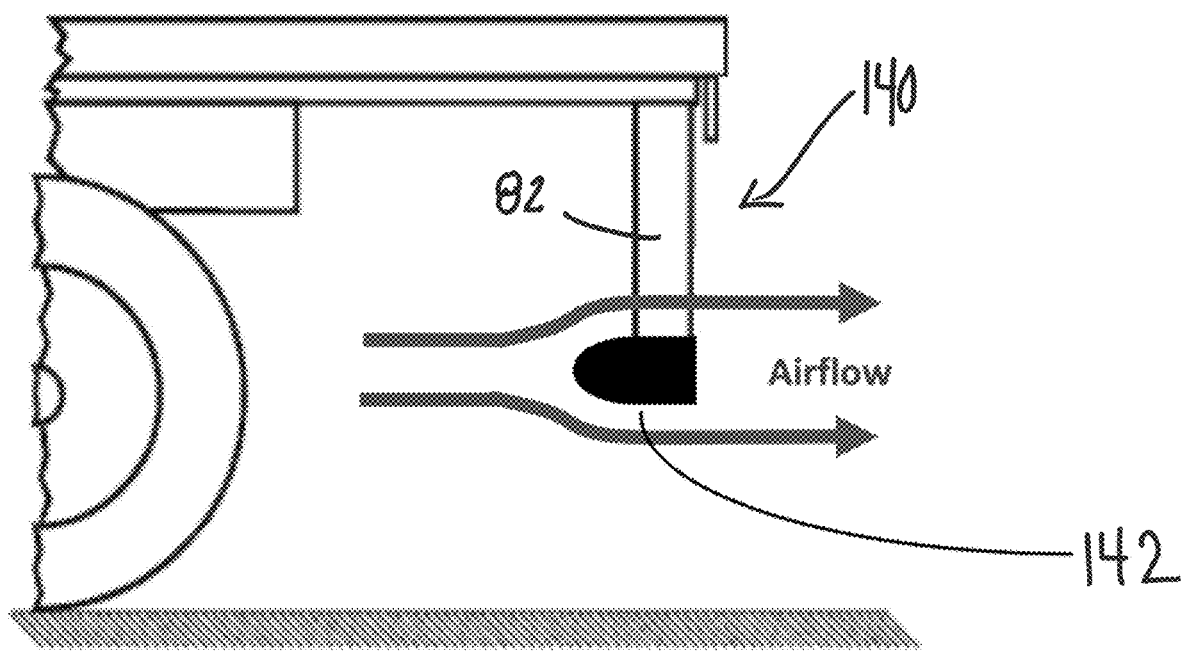
FIG. 21 is a side elevational view of an alternative apparatus for improving the aerodynamic drag of a vehicle, according to an embodiment of the present invention.

FIG. 21 illustrates a rear impact guard. 140 having vertical members 82, 84 and horizontal member 142 which are completely non flow through, like all guards on the road today. The horizontal member 142, however, has an aerodynamic shape (e.g., pointed, airfoil, or bullet shaped) to more efficiently direct air flow around the horizontal member 140 to reduce drag and fuel consumption. Additional aerodynamic shapes are also envisioned and are within the scope of the present invention.

Figure 22:
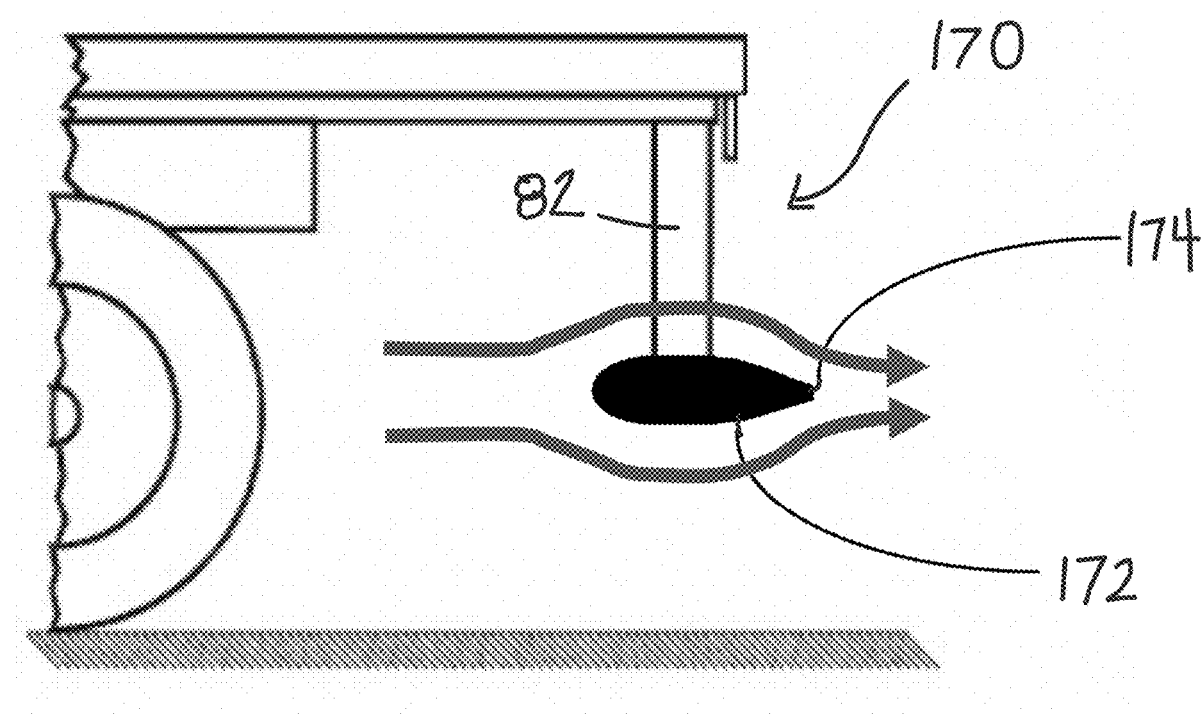
FIG. 22 is a side elevational view of another alternative apparatus for improving the aerodynamic drag of a vehicle, according to an embodiment of the present invention.

FIG. 22 illustrates another rear impact guard 170 having vertical members 82, 84 and horizontal member 172 which are, likewise, completely non flow through. As shown therein, the horizontal member 172 has an airfoil shape to more efficiently diced air flow around the horizontal member 170 to reduce drag and fuel consumption, as indicated by the arrows. Importantly, the horizontal member 172 has a vertical rear face 174 (rather than terminating at a sharp point), which presents a rear-ward facing surface for the attachment of reflective tape or reflective painting. In an embodiment, the height of the vertical rear face may be selected to comply with regulations relating to visibility or conspicuity. In the embodiment of FIGS. 21 and 22, the horizontal members may be formed using any means known in the art, such as via weldment or extrusion.

Figure 23:
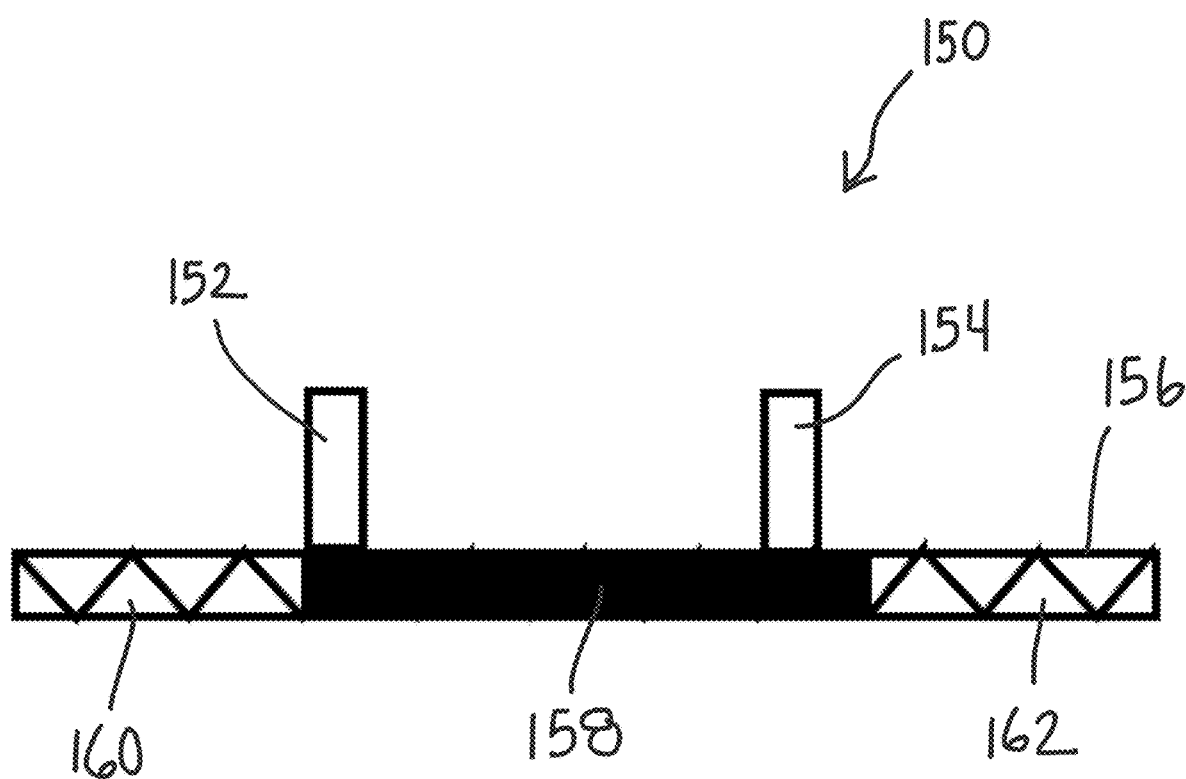
FIG. 23 is an elevational view of a rear impact guard for a semi-trailer, according to another embodiment of the invention.

Turning finally to FIG. 23, a rear impact guard 150 according to another embodiment of the present invention is illustrated. The rear impact guard 150 includes a pair of vertical members 152, 154 and a horizontal member 156. The horizontal member 156 includes a solid portion 158 and a plurality of flow-through portions 160, 162. It is contemplated that the flow through portions may be formed by corrugations of any configuration, such as those disclosed above. In an embodiment, the vertical members 152, 154 may likewise include some solid (i.e., non-flow-through) sections and some flow through sections. This hybrid approach could allow the outward, or any section with the highest velocity and drag, to be flow through and other lower velocity sections to be non-flow through, giving flexibility to the design options to reduce drag while meeting safety and conspicuity requirements.

The rear impact guard of the present invention therefore minimizes the aerodynamic drag of a semi-trailer, reducing fuel consumption and overall operating cost. In particular, allowing airflow through the guard's vertical and/or horizontal members, or portions of the members, reduces aerodynamic drag. This is accomplished by a design that allows flow through in the driving direction, but maintains structural stiffness to provide the needed strength and energy absorption in the driving direction to meet federal safety requirements. This would significantly reduce fuel consumption without any safety impact. In fact, the structural design could be tailored to improve safety performance by adding some "crumple zone" functionality while reducing drag and saving fuel which could lead to widespread industry adoption.

In certain embodiments, as disclosed above, the rear impact guards are configured to more efficiently direct airflow around the guard, or portions of the guard's vertical or horizontal members, to reduce the aerodynamic drag. This can be accomplished by designing the guard's forward and/or rear faces to more efficiently direct airflow around the guard reducing aerodynamic drag and fuel consumption. This could be done for the entire guard, or for portions of the guard. A combined (some flow through, some non-flow through) design approach might be desired for locating reflectors or reflective tape on the rear-facing sides, or for improved structural performance in certain areas.

It is contemplated that the rear impact guards disclosed herein can be manufactured from a variety of materials known in the art such as, for example, steel, aluminum, or hybrid construction, or non-metallic composite construction. The rear impact guards can be connected to a vehicle using any means known in the art such as via bolting, welding or brazing. The rear impact guard, itself, can be constructed using welding, brazing, bolting and/or extrusion.

In any of the above-described embodiments, the horizontal members may be manufactured to be thicker in the areas where the horizontal members attach to the vertical supports. This thickness may be provided by a thicker top plate, an additional top plate and/or via thicker internal webbing (i.e., the internal members that define the air flow passages). For example, in the embodiment of FIG. 10, the X-shaped braces may be manufactured to be thicker in the area of the vertical supports 14, 16. This increased thickness allows for a more robust and reliable structural connection to the vertical members, such as by welding.

As alluded to above, the flow through passages may take any shape or configuration. In an embodiment, the horizontal member may be formed by welding a plurality of small sections of cylindrical tubing to one another (where, in such case, the flow through passages are circular in shape). Welding square tube sections can likewise be utilized to form a horizontal member with square passages.

While the present invention has been disclosed above as a rear impact guard for a semi-trailer, it is not intended that the present invention be so limited in this regard. In particular, it is contemplated that the rear impact guard of the present invention may be utilized on a variety of vehicles including, but not limited to, semi-trailers, tractor trailers, trucks, automobiles and the like. It is further envisioned that other structural or non-structural components of the trailer or vehicle can be configured with flow-through passages in a similar manner, with the same benefit of reducing aerodynamic drag. Such components may include, for example, bumpers, deflectors and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A rear impact guard, comprising:
at least one vertical member; and
a horizontal member connected to the at least one vertical member, the horizontal member having a plurality of through passages extending continuously through the horizontal member allowing for air flow entirely through the horizontal member.

2. The rear impact guard of claim 1, wherein:
the horizontal member includes a plurality of corrugations defining therebetween the plurality of through passages;
wherein the plurality of through passages are triangular in shape.

3. The rear impact guard of claim 1, wherein:
the horizontal member includes a plurality of vertically extending and horizontally spaced corrugations defining therebetween the plurality of through passages;
wherein the plurality of through passages are rectangular in shape.

4. The rear impact guard of claim 1, wherein:
the horizontal member includes a plurality of structural ribs arranged in a grid pattern; and
wherein the plurality of through passages are rectangular in shape.

5. The rear impact guard of claim 1, wherein:
the horizontal member includes a plurality of X-shaped structural members defining the plurality of through passages;
wherein at least some of the plurality of through passages are diamond shaped.

6. The rear impact guard of claim 1, wherein:
the horizontal member includes at least one solid section preventing the flow of air therethrough.

7. The rear impact guard of claim 1, wherein:
the horizontal member has an aerodynamic shape.

8. The rear impact guard of claim 7, wherein:
the horizontal member has an angled lower surface, angled between 0 and 90 degrees in relation to a vertical axis.

9. The rear impact guard of claim 6, wherein:
an upper portion of the horizontal member includes the plurality of through passages; and
wherein a lower portion of the horizontal member defines the at least one solid section.

10. The rear impact guard of claim 1, wherein:
the at least one vertical member is a plurality of vertical members.

11. The rear impact guard of claim 10, wherein:
at least one of the vertical members includes a plurality of through passages allowing for air flow through the vertical member.

12. A semi-trailer, comprising:
a rear impact guard mounted at a rear end of the semi-trailer, the rear impact guard having a pair of vertical members each having a proximal end connected to the rear end of the semi-trailer and an opposed distal end, and a horizontal member carried at the respective distal ends of the pair of vertical members;
wherein the horizontal member has a plurality of through passages extending from a front face to a rear face of the horizontal member, allowing for air flow through the horizontal member to reduce aerodynamic drag of the semi-trailer.

13. The semi-trailer of claim 12, wherein:
the horizontal member includes a plurality of corrugations defining therebetween the plurality of through passages;
wherein the plurality of through passages are triangular in shape.

14. The semi-trailer of claim 12, wherein:
the horizontal member includes a plurality of vertically extending and horizontally spaced corrugations defining therebetween the plurality of through passages;
wherein the plurality of through passages are rectangular in shape.

15. The semi-trailer of claim 12, wherein:
the horizontal member includes a plurality of structural ribs arranged in a grid pattern; and
wherein the plurality of through passages are rectangular in shape.

16. The semi-trailer of claim 12, wherein:
the horizontal member includes a plurality of X-shaped structural members defining the plurality of through passages;
wherein at least some of the plurality of through passages are diamond shaped.

17. The semi-trailer of claim 12, wherein:
the horizontal member includes at least one solid section preventing the flow of air therethrough.

18. A method for reducing the aerodynamic drag of a vehicle or trailer, comprising the steps of:
mounting an underride guard to a rear of the vehicle or trailer, the underride guard having at least one vertical member and a horizontal member connected to the at least one vertical member, the horizontal member having a plurality of continuous through passages extending entirely through the horizontal member, allowing for air flow through the horizontal member.

19. The method according to claim 18, wherein:
the horizontal member has an aerodynamic shape.

* * * * *